United States Patent
Cochran et al.

(10) Patent No.: US 7,478,154 B2
(45) Date of Patent: Jan. 13, 2009

(54) STORAGE SYSTEM WITH LINK SELECTION CONTROL

(75) Inventors: Robert A. Cochran, Roseville, CA (US); Marcel Duvekot, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 926 days.

(21) Appl. No.: 10/608,585

(22) Filed: Jun. 26, 2003

(65) Prior Publication Data

US 2004/0267959 A1 Dec. 30, 2004

(51) Int. Cl.
*G06F 15/173* (2006.01)
*G06F 15/16* (2006.01)
*H04L 12/56* (2006.01)

(52) U.S. Cl. .............. 709/224; 370/229; 370/395.4; 370/395.41; 709/232; 709/233

(58) Field of Classification Search ......... 709/223–224, 709/233, 241, 226; 370/431, 464, 216, 248, 370/254, 401, 395.4–395.43
See application file for complete search history.

(56) References Cited

U.S. PATENT DOCUMENTS

| | | | |
|---|---|---|---|
| 6,178,448 B1 * | 1/2001 | Gray et al. | 709/224 |
| 6,222,858 B1 * | 4/2001 | Counterman | 370/474 |
| 6,240,140 B1 * | 5/2001 | Lindbergh et al. | 375/260 |
| 6,516,348 B1 * | 2/2003 | MacFarlane et al. | 709/224 |
| 6,643,709 B1 * | 11/2003 | Kwon | 709/246 |
| 6,647,028 B1 * | 11/2003 | Lancon et al. | 370/535 |
| 6,910,149 B2 * | 6/2005 | Perloff et al. | 714/4 |
| 7,184,402 B1 * | 2/2007 | Sharma et al. | 370/232 |
| 7,263,100 B2 * | 8/2007 | Hauser et al. | 370/395.41 |
| 2002/0010866 A1 * | 1/2002 | McCullough et al. | 713/201 |
| 2002/0018447 A1 * | 2/2002 | Yamada et al. | 370/252 |
| 2004/0062198 A1 * | 4/2004 | Pedersen et al. | 370/229 |
| 2004/0228278 A1 * | 11/2004 | Bruckman et al. | 370/231 |

FOREIGN PATENT DOCUMENTS

| | | |
|---|---|---|
| JP | 9179806 | 7/1997 |
| JP | 2001297026 | 10/2001 |

OTHER PUBLICATIONS

English Translation of Japanese Patent Office Notice of Rejection dated Jun. 12, 2008.

* cited by examiner

*Primary Examiner*—Ario Etienne
*Assistant Examiner*—Brendan Y Higa

(57) ABSTRACT

A storage system comprises an interface capable of interconnecting a network infrastructure via a plurality of communication links. The plurality of communication links has a diversity of data-carrying capacity and performance. The storage system further comprises a controller coupled to the interface that assigns the plurality of communication links into at least one link affinity group based on performance criteria and controls link selection based on link affinity group assignment.

24 Claims, 7 Drawing Sheets

| Link 0 1 2 3 4 5 6 7 8 9 | LAG | Comments | Suitable For RR | NAL | HA |
|---|---|---|---|---|---|
| X X | a | highest cost mission critical | X | X | X |
| X X X X | b | highest throughput group | X | X | X |
| X X | c | 100bT LAN group | X | X | X |
| X | d | T3 same speed group | X | X | X |
| X | e | T1 heartbeat/I'm alive group | X | X | X |
| X X X X X X X X | f | all inclusive group | | X | X |
| X X X | g | hardened path inter-LAG group | | X | X |
| X X X X | h | top 2 speeds intra-LAG group | | X | X |
| X X X X X | i | non mission critical inter-LAG | | X | X |
| X X X X X | j | group health sampling inter-LAG | | X | |
| X | k | single ATM group | X | X | |
| X | l | single ESCON group | X | X | |
| X | m | single 100bT (may be shared) | X | X | |
| X | n | single 100bT (not shared) | X | X | |

| Link | |
|---|---|
| 0 | ATM OC-3 (19MB/s) - H |
| 1 | ATM OC-3 (19MB/s) |
| 2 | ESCON (17MB/s) - H |
| 3 | ESCON (17MB/s) |
| 4 | ESCON (17MB/s) |
| 5 | ESCON (17MB/s) |
| 6 | 100bT (12MB/s) - H |
| 7 | 100bT (12MB/s) |
| 8 | T3 (5MB/s) |
| 9 | T1 (0.175MB/s) |

H - hardened security path link
RR - Round Robin algorithm
NAL - Next Available Link Algorithm
HA - Highly Available

| Link | | | | | | | | | | LAG | Comments | Suitable For | | |
|---|---|---|---|---|---|---|---|---|---|---|---|---|---|---|
| 0 | 1 | 2 | 3 | 4 | 5 | 6 | 7 | 8 | 9 | | | RR | NAL | HA |
| X | X | | | | | | | | | a | highest cost mission critical | X | X | X |
|  |  | X | X | X | X |  |  |  |  | b | highest throughput group | | X | X |
|  |  |  |  |  |  | X | X |  |  | c | 100bT LAN group | X | X | X |
|  |  |  |  |  |  |  |  | X |  | d | T3 same speed group | X | X | X |
|  |  |  |  |  |  |  |  |  | X | e | T1 heartbeat/I'm alive group | X | X | X |
| X | X | X | X | X | X | X | X | X | X | f | all inclusive group |  | X | X |
| X |  | X |  | X |  |  |  |  |  | g | hardened path inter-LAG group |  | X | X |
| X | X | X | X |  |  |  |  |  |  | h | top 2 speeds intra-LAG group |  | X | X |
|  |  |  |  | X | X | X | X |  |  | i | non mission critical inter-LAG |  | X |  |
| X |  | X |  | X |  | X |  | X |  | j | group health sampling inter-LAG | X | X |  |
| X |  |  |  |  |  |  |  |  |  | k | single ATM group | X | X |  |
|  |  | X |  |  |  |  |  |  |  | l | single ESCON group | X | X |  |
|  |  |  |  |  |  | X |  |  |  | m | single 100bT (may be shared) | X | X |  |
|  |  |  |  |  |  |  | X |  |  | n | single 100bT (not shared) | X | X |  |

| Link | |
|---|---|
| 0 | ATM OC-3 (19MB/s) - H |
| 1 | ATM OC-3 (19MB/s) |
| 2 | ESCON (17MB/s) - H |
| 3 | ESCON (17MB/s) |
| 4 | ESCON (17MB/s) |
| 5 | ESCON (17MB/s) |
| 6 | 100bT (12MB/s) - H |
| 7 | 100bT (12MB/s) |
| 8 | T3 (5MB/s) |
| 9 | T1 (0.175MB/s) |

H - hardened security path link
RR - Round Robin algorithm
NAL - Next Available Link Algorithm
HA - Highly Available

FIG. 6

STORAGE SYSTEM WITH LINK SELECTION CONTROL

BACKGROUND OF THE INVENTION

Existing methods of interconnecting a network infrastructure by way of dedicated, high-speed lines, for example for remote Logical Unit (LUN) mirroring, are limited. For example, lines between two replicating disk arrays are constrained to be identical in capacity to attain the best chance for non-ordered writes to be applied to a remote disk array in the correct order. For example, if a user begins with a single Asynchronous Transfer Mode Optical Channel-3 (ATM OC-3) line, with a throughput of about 19 Megabytes/second (MB/s), and adds an identical line, the aggregate mirroring between the disk arrays improves by about 100 percent, within the scaling limits of the hardware/software infrastructure.

However, if a user instead adds a slower second line, for example a T3 line with throughput of about 5 MB/s, the aggregate mirroring throughput, rather than increasing by the addition of resources, actually has an aggregate mirroring throughput that is reduced to approximately twice the speed of the slower line. In a configuration with multiple lines, the throughput is reduced to the speed of the slowest line times the number of lines. Throughput reduction results from quirks of a customary 'round robin' selection process for determining next usage of a transmission line.

Throttling occurs for aggregation of transmission lines of dissimilar speeds. Throttling phenomena can be explained with analogy to a group of cars lined up on a first-come, first-served basis on one side of a river awaiting usage of two single-car ferries to transport the cars to the river's other side. The number of cars that can be ferried per hour via the slowest ferry is given to be X. If both ferries are the same speed, the number of cars ferried per hour is 2X. In this case, requirements that the cars reach the other side in the exact order of queuing on the first side, and that usage of the ferries alternates in a strictly round robin order, do not impact the throughput of either ferry.

In contrast, if one ferry travels at a speed Y that is substantially faster than X, imposition of a requirement of round robin ferry selection can greatly limit the number of cars ferried in comparison to the maximum possible number that the faster speed Y could otherwise enable. Specifically, even with a ferry capable of traveling at the faster speed Y, strict adherence to round robin ferrying limits the capacity of the aggregate transport system to a speed of 2X. The higher speed of the faster ferry does not improve aggregate capacity because the faster ferry is nearly always stalled waiting for the slower ferry. When the speed Y is much larger than the speed X, the potential traffic, analogous to link bandwidth, that is forfeited by usage of round robin selection is equal to Y–X.

With respect to interconnections in a storage system, round robin link selection similarly impacts throughput. For example, if a T3 line with capacity of 5 MB/s is currently in use between two mirroring disk arrays and Information Technology (IT) infrastructure changes add an ATM OC-3 line with capacity of 20 MB/s, the total aggregate throughput is limited to 2×5 MB/s or 10 MB/s due to throttling effects of forced round robin link usage. Conversely, if a 20 MB/s line is originally in use and a newly available 5 MB/s line is added, the result is a drop in aggregate line performance from 20 MB/s to 10 MB/s. FIGS. 8A, 8B, 8C, and 8D show examples of detrimental throttling due to round robin usage of unmatched links. In each case a pair of disk arrays 800 communicates over a variety of links. FIG. 8A depicts a system connected by a 100 MB/s Fibre Channel (FC) link and a shared FC link with available capacity of 20 MB/s. The potential aggregate capacity is 200 MB/s but the actual aggregate throughput is 40 MB/s, twice the available capacity from the shared link.

FIG. 8B shows a system connected by a dedicated 100 MB/s internet Small Compute Systems Interface (iSCSI)/ Ethernet link and a shared iSCSI/Ethernet link with an available capacity of 50 MB/s. The potential aggregate capacity is 200 MB/s but the actual aggregate throughput is 100 MB/s, twice the available capacity from the shared link.

FIG. 8C illustrates a system connected by a dedicated 100 MB/s Fibre Channel (FC) link and a 17 MB/s Enterprise System Connection (ESCON) link. The potential aggregate capacity is 134 MB/s but the actual aggregate throughput is 34 MB/s, twice the slow ESCON link.

FIG. 8D illustrates a system connected by two dedicated 100 MB/s Gigabit Ethernet (gigE) links and a dedicated 10 MB/s Ethernet 10/100 bT link. The potential aggregate capacity is 210 MB/s but the actual aggregate throughput is 30 MB/s, three times the throughput of the slowest link.

SUMMARY

Because actual customer Information Technology (IT) infrastructures often include many lines with disparate speeds, throughput performance can greatly improve by usage of a system and operating method that enable adding of incremental replication lines of any throughput without penalizing total aggregate mirroring throughput. Such a system and method, for example applied within the context of ordered asynchronous data mirroring, can greatly improve throughput in a wide variety of situations and configurations.

According to some embodiments, a method of interconnecting a network infrastructure via a plurality of communication links comprises classifying the plurality of communication links according to a link affinity grouping, enabling and disabling selective ones of the plurality of communication links according to the link affinity grouping, and activating a particular link selected from among the enabled communication links using a selection process adapted to characteristics of the link affinity grouping.

According to other embodiments, a method of communicating data in a network infrastructure via a plurality of communication links comprises interconnecting a plurality of communication links between a local array and a remote array, maintaining a list of links available to carry the data, including a link on the list when the link becomes available, activating the next available link on the list, and sending data over the activated next available link.

According to further embodiments, a storage system comprises an interface capable of interconnecting a network infrastructure via a plurality of communication links. The plurality of communication links has a diversity of data-carrying capacity and performance. The storage system further comprises a controller coupled to the interface that assigns the plurality of communication links into at least one link affinity group based on performance criteria and controls link selection based on link affinity group assignment.

In accordance with still other embodiments, an article of manufacture comprises a controller usable medium having a computable readable program code embodied therein for interconnecting a network infrastructure via a plurality of communication links. The computable readable program code further comprises a code capable of causing the controller to classify the plurality of communication links according to a link affinity grouping, and a code capable of causing the controller to enable and disable selective ones of the plurality of communication links according to the link affinity grouping. The computable readable program code further comprises a code capable of causing the controller to activate a particular link selected from among the enabled communication links using a selection process adapted to characteristics of the link affinity grouping, and a code capable of causing the controller to analyze performance of the enabled communication links individually and in aggregate.

In other embodiments, an article of manufacture comprises a controller usable medium having a computable readable program code embodied therein for communicating data in a network infrastructure via a plurality of communication links. The computable readable program code further comprises a code capable of causing the controller to interconnect a plurality of communication links between a local array and a remote array, a code capable of causing the controller to maintain a list of links available to carry the data, and a code capable of causing the controller to include a link on the list when the link becomes available. The computable readable program code further comprises a code capable of causing the controller to activate the next available link on the list, and a code capable of causing the controller to send data over the activated next available link.

BRIEF DESCRIPTION OF THE DRAWINGS

Embodiments of the invention relating to both structure and method of operation, may best be understood by referring to the following description and accompanying drawings.

FIG. 6 is a table showing examples of potential Link Affinity Groups (LAGs).

DETAILED DESCRIPTION

Modern disk arrays are remotely linked via a variety of link types such as ATM OC-3, T3, T1, Satellite hop, and others. Current systems require that multiple links between two arrays must each be of identical bandwidth capacity. Failure to comply with this rule can drastically drop the total throughput between the two arrays because the round robin link usage algorithm causes the slowest link to throttle the aggregated link throughput.

A capability to perform ordered packet reassembly at the receiving end enables usage of other link selection algorithms and processes, such as a "Next Available Link" method allowing usage of the full throughput capacity of links with widely differing speed capabilities, so that users can fully exploit available piecemeal parallel communication lines of disparate capacity without penalty in overall remote replication throughput.

A concept of line affinity is defined herein that can assure that most mission-critical LUN group packets are assigned to communicate over a specific subset of links, for example a primary or backup link group, to take advantage of highly secure routing or other link characteristics.

Although counterintuitive, disabling one or more lowest speed mismatched links may significantly improve the aggregate round robin link throughput. Accordingly, in some embodiments a control process can optionally analyze individual link performance and notify a user if: (A) a particular link's throughput falls too far below a selected limit assigned for the link group, and (B) disabling one or more links can improve the aggregate link group throughput.

Figure 1:
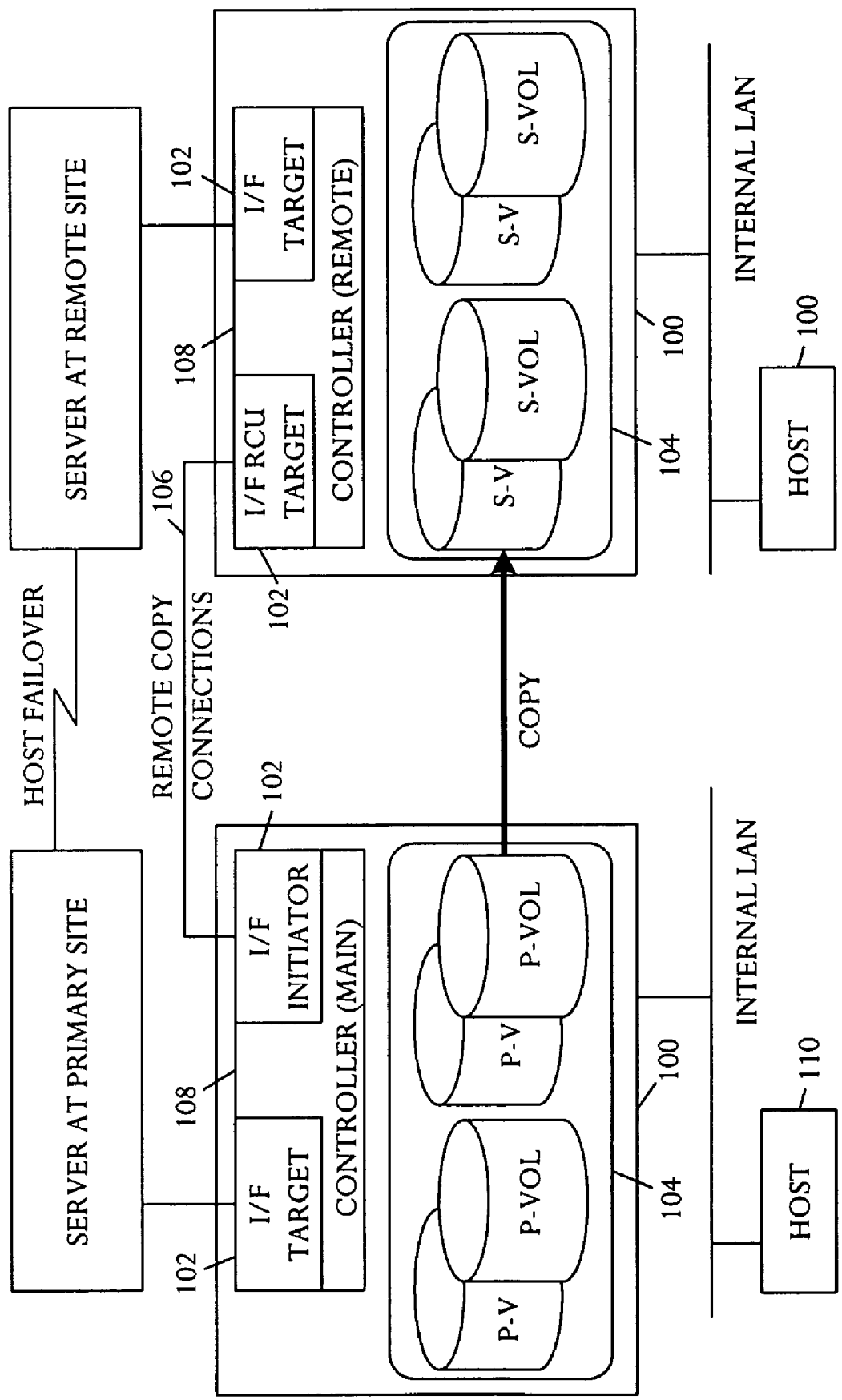
FIG. 1 is a schematic block diagram illustrating an embodiment of a storage system with an interface capable of interconnecting disk arrays via a plurality of communication links.

Referring to FIG. 1, a schematic block diagram illustrates an embodiment of a storage system 100 that comprises an interface 102 capable of interconnecting a network infrastructure, illustratively a plurality of disk arrays 104, via a plurality of communication links 106. The plurality of communication links 106 has a diversity of data-carrying capacity and performance. The storage system 100 further comprises a controller 108 coupled to the interface 102. The controller 108 assigns the plurality of communication links 106 into at least one link affinity group based on performance criteria and controls link selection based on link affinity group assignment.

The link affinity group is generally selected by an administrator or user to achieve a particular defined performance or reliability characteristic. Various link affinity group assignments may include all available links, a particular link subset, or groupings that are combinations within a particular link affinity group, extending to multiple groups or across groups.

The controller 108 analyzes performance of the enabled communication links 106 individually and in aggregate. Data for analysis is accessed from the interface 102 and can be in the form of timing signals indicative of the time to respond to a request, for example accessed from timer tables. Bandwidth information can also be derived from timing information.

In some embodiments, controller logic can be implemented in firmware or software. In typical implementations, the controller logic can be included in disk array firmware, with or without cooperation from host software executing on a dedicated array management host system 110 and/or user interfaces. In other examples, the logic can be implemented in devices or components such as fibre channel and other switches, Small Computer Systems Interface (SCSI) interfaces, bridges, servers, routers, host computers, directors, protocol converters, and the like.

Based upon the analysis, the controller 108 can perform one or more of several actions. The controller 108 can determine whether the link throughput has degraded to a predetermined level. In one example, the controller 108 can be set to determine when an individual link throughput has degraded X percent for more than a time T with X and T predefined by an administrator or user.

Based on the analysis of individual link and group aggregate performance, the controller 108 can issue one or more recommendations for display or notification of the administrator or user. For example, the controller 108 can link groupings into appropriate link affinity groups based on potential throughput, link path security ratings, logical unit (LUN) criticality ratings, and the like. In another example, the controller 108 can determine whether disabling or deleting a low throughput link from a previously formed link affinity group will improve aggregate link affinity group throughput. Alternatively, the controller 108 can determine whether altering the link mix, for example by moving a particular link from a first link affinity group to another, or to a new group, will benefit the aggregate throughput of both groups. The controller can communicate any appropriate recommendations to the administrator or user.

In some embodiments, the controller 108 can automatically implement the recommendations, if enabled, to improve aggregate throughput by enabling and/or disabling selected links.

The illustrative system 100 is shown intercommunicating with a similar or identical system. In various applications, conditions, and embodiments, the system 100 can, and usually does, communicate and interact with many various types of storage systems, components, and devices, both similar and dissimilar.

Figure 2:
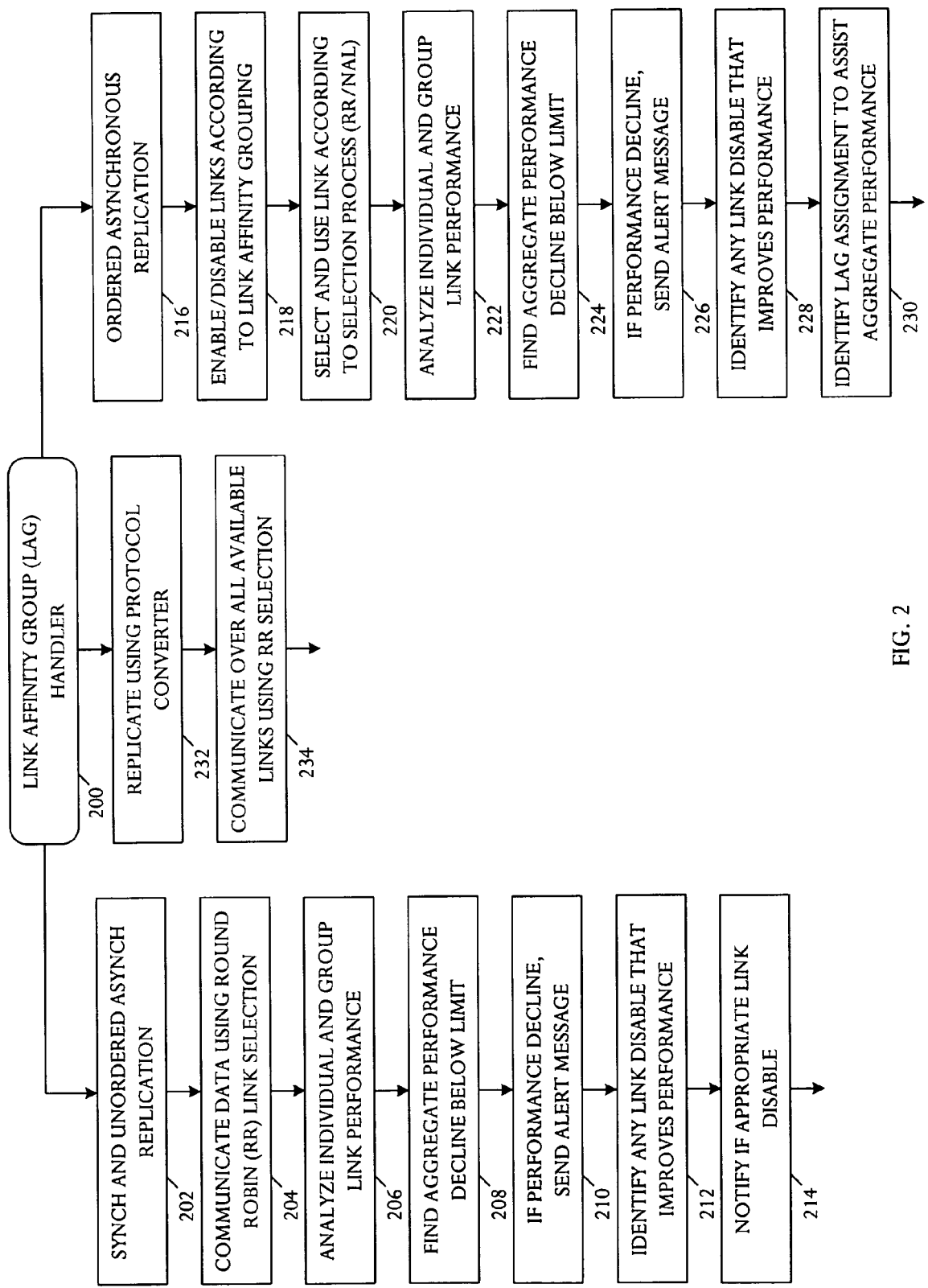
FIG. 2 is a schematic flow chart depicting an embodiment of a process that implements link affinity group handling.

Referring to FIG. 2 in combination with FIG. 1, a schematic flow chart depicts an embodiment of a process, procedure, or method 200 that can be performed by the controller 108 to implement link affinity group handling. In various embodiments, the link control techniques can be implemented in participating host and disk arrays, for example on a per-logical unit (LUN) or LUN-group basis, in software and/or firmware.

Disk array replication generally takes place according to, or within variations of, synchronous, unordered asynchronous, and ordered asynchronous types. Synchronous replication is, by definition, ordered. A pair of disk arrays often simultaneously has some replicated Logical Unit (LUN) groups of each type. Synchronous and unordered asynchronous LUN groups are typically not configured within a Consistency Group. A Consistency Group is an arrangement of LUNs in which the write order of each LUN within the Consistency Group at a remote site is deterministically guaranteed to be the same as each corresponding LUN on the local site. In contrast, ordered asynchronous communication does typically use a Consistency Group.

Typical known disk array mirroring techniques are inflexible and are configured to accommodate the worst-case scenario, synchronous or unordered asynchronous, non-Consistency Group data replication.

If multiple lines are available for replication and Consistency and non-Consistency group mirroring are both used, an inflexible round robin method for using the multiple links is the only way to non-deterministically preserve write ordering, and avoid data corruption, at the remote site. Typical known disk arrays allow writes of up to 256 Kilobytes (KB) per LUN to be aggregated into a link efficient write of 1 Megabyte (MB). A system using other than round robin link assignment risks potential data corruption. For example if the system uses a fast link for writes 1, 3, and 5, and a slow link for write 2 and 4, remote writes can be applied out-of-order, possibly corrupting data.

More recently-available disk arrays are capable of asynchronous ordered remote write sorting, for example of the basis of sequence numbers or time stamps, to accommodate mis-ordered writes. The illustrative method 200 of implementing link affinity group handling avoids the constraints of round robin handling and the associated severe reduction in aggregate replication throughput in some conditions.

In management of synchronous and unordered asynchronous disk array replication with no consistency group assignment 202, the controller 108 can communicate data over all available links using a round-robin order selection process 204. The controller 108 analyzes individual and group link performance 206 and determines whether the aggregate performance has declined to below a predetermined limit 208. If so, the controller 108 generates an alert message 210.

In a general example of system operation, multiple lines represented by lines 1, 2, 3, . . . , N having actual throughput of A, B, C, . . . , X megabytes/second (considering effects of latency and packet loss on theoretical throughput) are constrained due to effects of the round robin link usage algorithm to a total aggregate throughput of N times the lowest throughput link. A counterintuitive effect of this result is that the aggregate link throughput of a group of lines can be increased by deleting or disabling one or more of the slower lines.

In one example, four 100 bT lines can be aggregated for mirroring between two disk arrays and three of the four dedicated for operation at a 100 Mbit capacity, while the fourth line is shared for other operations, leaving only a 20 Mbit capacity. The aggregate link capacity is 80 Mbit, the slowest link bandwidth (20 Mbit) times the number of links (4), rather than the potential capacity of 400 Mbit. The capacity forfeited by the arrangement is equal to (3×100+20)−4×20=240 Mbit forfeited out of a possible 320 Mbit. By deleting the slowest link from operation, the aggregate link throughput increases to 300 Mbit, nearly a four times improvement.

Accordingly, the controller 108 can identify individual links where, based on the analysis, disabling of the identified link from the aggregate in the link affinity grouping will improve aggregate throughput 212. A notification message can be communicated to the administrator or user 214, for example via user interface, indicating the condition.

The controller 108 can also make recommendations, based on the analysis, about appropriate link configuration. Best performance in conditions of synchronous and unordered asynchronous disk array replication with no consistency group assignment is attained when all links in an aggregated set are identical in net bandwidth, after taking into account effects of latency and packet loss. For example, pairing a dedicated dark fiber T3 line with a satellite-based or microwave T3 with much higher latency and packet loss can violate the rule and forfeit much of the aggregate bandwidth potential.

In management of ordered asynchronous disk array replication 216, the controller 108 enables and disables selective links of the plurality of communication links 218 according to the link affinity grouping. The controller 108 activates a particular link selected from among the enabled communication links using a selection process adapted to characteristics of the link affinity grouping 220. One selection may be round-robin link selection. A second selection is a Next Available Link (NAL) selection process.

The controller 108 analyzes individual link and group performance 222. The controller 108 determines whether the aggregate performance has declined to below a predetermined limit 224, and generates an alert message for performance declines below the limit 226.

The controller 108 can identify individual links where, based on the analysis, disabling of the identified link from the aggregate in the link affinity grouping improves aggregate throughput 228. The controller 108 can also determine, based on the analysis, whether altering assignment of links of two link affinity groups improves throughput of both groups 230.

Figure 3:
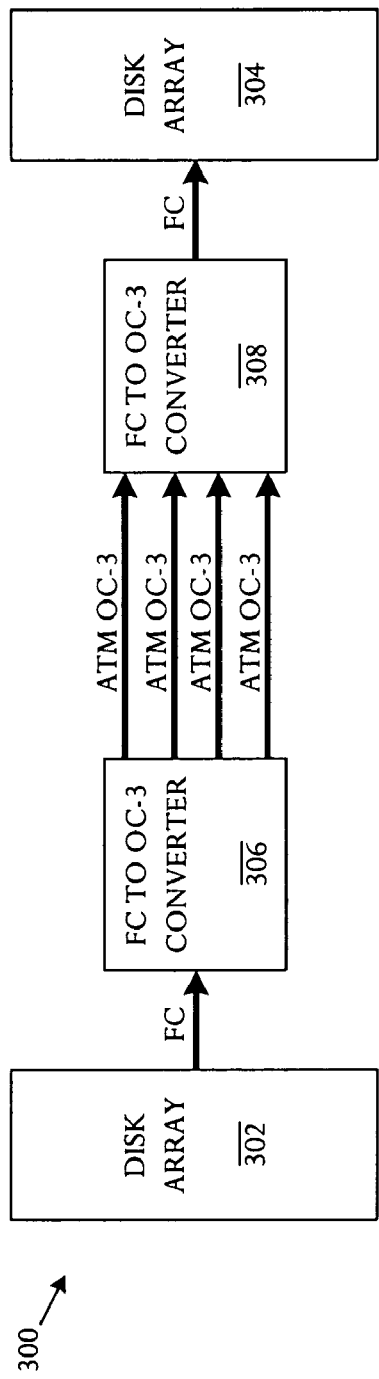
FIG. 3 is a schematic block diagram illustrating an embodiment of a protocol conversion between mirrored disk arrays.

In management of disk array replication using a protocol converter 232, the controller 108 can communicate data over all available links in a round-robin order over identical throughput links 234. Referring to FIG. 3, a schematic block diagram illustrates an embodiment of a protocol conversion 300 between mirrored disk arrays 302 and 304. Links between mirroring arrays can be direct, otherwise termed dedicated or native, via switches or directors, or via protocol converters. Switches or directors do not convert from one protocol to another. Protocol converters typical are available in two variations including pass-through converters that do not buffer or reorder packets, and spoofing converters that do buffer and reorder packets. An example of a pass through converter is Inrange 9801 from Inrange Technologies Corporation of Lumberton, N.J. Examples of spoofing converters include CNT Ultranet or 'Edge' from CNT of Minneapolis, Minn.

The illustrative protocol conversion 300 includes two Fibre Channel (FC) to Optical Channel-3 (OC-3) converters 306 and 308. The protocol converters 306 and 308 respectively communicate with disk arrays 302 and 304 via Fibre Channel links. The protocol converters 306 and 308 mutually communicate data via a plurality of Asynchronous Transfer Mode (ATM) OC-3 links. The protocol converters 306 and 308 are configured as back-to-back converters between the mirrored disk arrays 302 and 304. Protocol converters guarantee that remote side packet delivery order is the same as local side sending order regardless of differences in the number and type of links, and regardless of whether the pass through or spoofing methods are used.

Depending on the specific type of protocol conversion that is taking place, the number of links may increase or decrease as the links enter and leave a converter. For example, a CNT 'Edge" converter/switch may convert a single 100 MB/s Fibre Channel (FC) link to a specified larger number of ATM OC-3 links, for example two links, each at a throughput of 19 MB/s. Within the environment of replicated disk arrays, converters are typically used in back-to-back, matched pairs.

Figure 4:
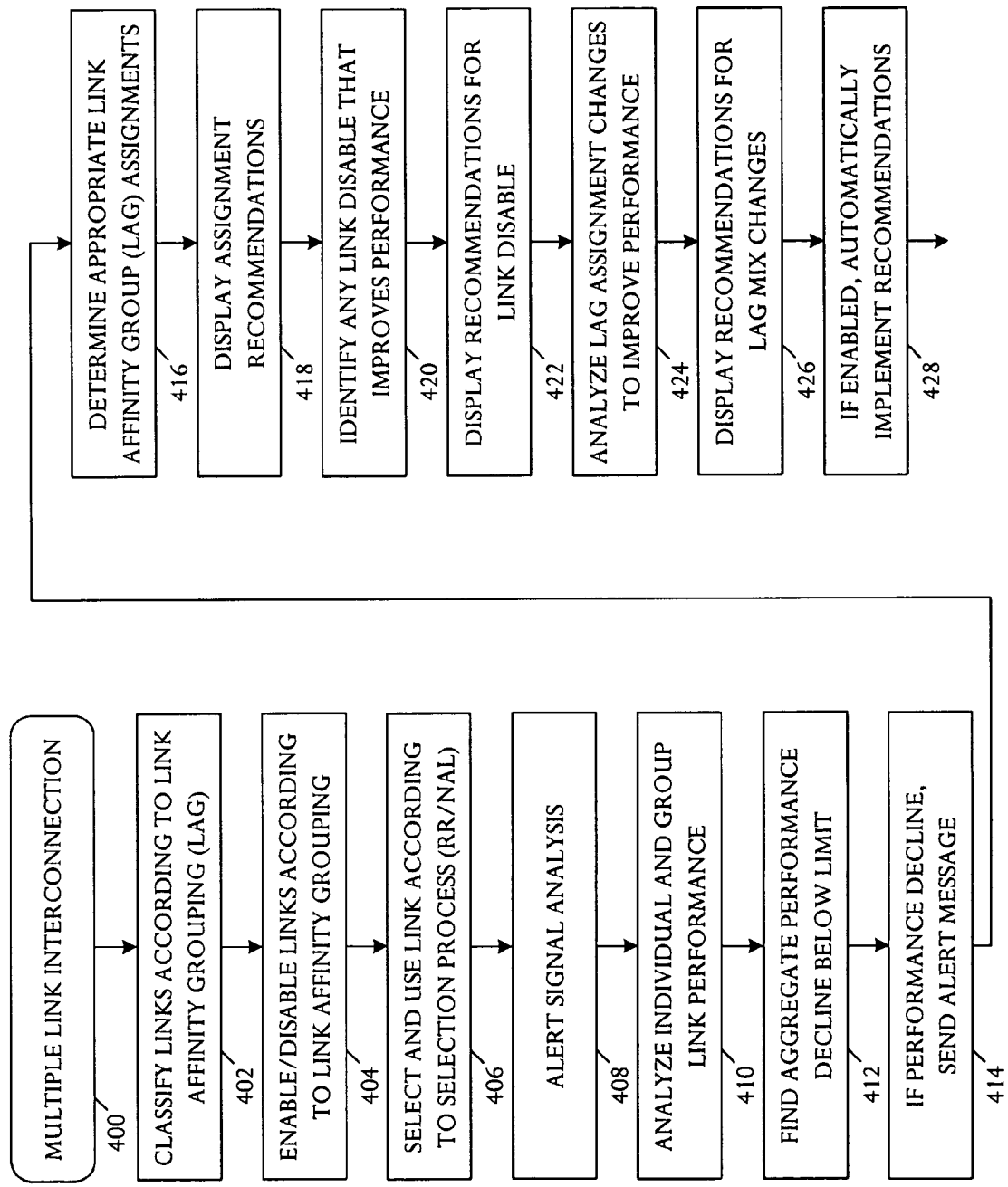
FIG. 4 is a flow chart showing a method of interconnecting disk arrays via a plurality of communication links.

Referring to FIG. 4, a flow chart shows a method of interconnecting a network infrastructure via a plurality of communication links 400. The method comprises classifying the plurality of communication links according to a link affinity grouping 402. One or more links may be grouped into a link affinity group to optimize for various criteria and conditions. Criteria include throughput using round-robin selection for determining the next active link, and throughput using the next available use selection process. Other conditions include variations in link path security and variations in link cost. Another criterion is variation in link availability. Some links may be activated only in an emergency. Some links are shared. Links can be assigned to affinity groups according to character as primary or secondary link groups for replication of a particular LUN group. Other criteria include status as intra-link affinity groups (LAG), inter-LAG partial inclusion groups, and inter-LAG full inclusion groups.

Link direction can be used as an affinity group criteria, including status as outbound or failover links, or as inbound or failback links. High availability gained by elimination or reduction in single points of failure is most prevalent in systems with links in both incoming and outgoing directions and in groups of at least two links. Links are typically considered to transmit data in a single direction, even though the links are generally in the form of a wire or fiber pair. For example, outbound or failover link affinity groups and inbound or failback link affinity groups facilitate high availability.

Figure 5:
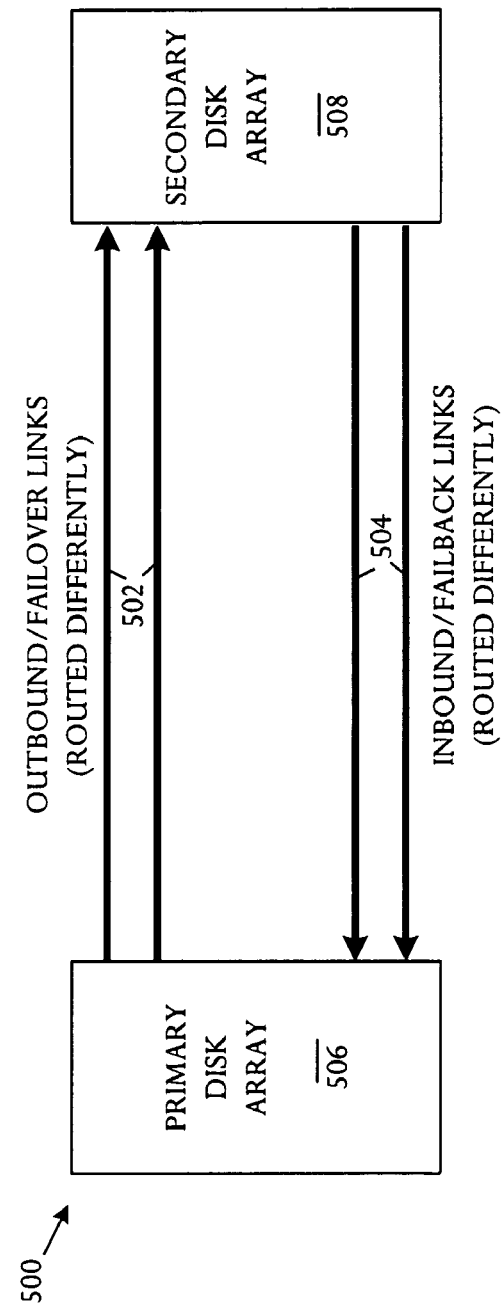
FIG. 5 is a schematic block diagram showing an embodiment of a minimum link configuration that promotes high availability.

In one example, depicted in the schematic block diagram shown in FIG. 5, a configuration that promotes high availability, a minimum link configuration 500 typically includes two outbound links 502 and two inbound links 504 with both link pairs routed differently. Redundant outbound 502 and inbound 504 links enable a single link or right-of-way failure while retaining critical failover and failback capability. In the example, the redundant outbound 502 and inbound 504 links interconnect mirrored disk arrays including a primary disk array 506 and a secondary disk array 508.

Referring again to FIG. 4, the method further comprises selectively enabling and disabling particular links of the plurality of communication links according to the link affinity grouping 404. An example of the operation for enabling and disabling selected links 404 is depicted in tabular form in FIG. 6. The table shows examples of potential Link Affinity Groups (LAGs) in the outbound direction. Although the example depicts operation for links in the outbound or failover direction, the concepts apply similarly to inbound/ failback links. The table illustrates examples of possible Link Affinity Groups (LAGs) with groupings defined by various criteria and metrics.

The table shows that several LAGs (a, b, c, d, k, l, m, n) are appropriate, having no performance penalty, for round robin link selection. Other LAGs (e, f, g, h, i, j) have degraded performance under round robin handling. Some LAGs (a) are appropriate for remote replication of mission critical data, the other LAGs are not.

The weakness of utilizing round robin handling alone for the illustrative links is shown. For example, LAG group f throttles to 0.175 Megabytes/second (MB/s) times ten or 1.75 MB/s total aggregate throughput.

In contrast, the illustrative technique for controlling link selection can manage the link affinity groups more effectively, using round robin selection for appropriate groups and other selection methods, such as next available link, for other LAGs. For example, round robin selection can be used for LAG group b to attain 68 MB/s aggregate throughput for replication of some LUN groups, while concurrently using next available link selection with other LAGs or other LUN groups such as LAG group h to attain 106 MB/s aggregate throughput. The illustrative flexible technique for selecting links can greatly improve throughput performance in many or most configurations that involve interconnection of diverse-characteristic links.

Examples of suitable user interfaces for defining LAG groups can include define_a_lag and lag_affinity as follows:

```
define_a_lag(destination, links)
for example:
define_a_lag("a", 0, 1)        /* creates LAG 'a' including links 0 & 1
define_a_lag("b", 2, 3, 4, 5)  /* creates LAG 'b' including links 2, 3, 4, 5
lag_affinity(LUN_group, primary_LAG, failback_LAG)
for example:
lag_affinity(Mission_Critical_dB_LUN_Group, "a", "b")
```

For example, the lag_infinity interface can designate that the most important LUN group, Mission_Critical_dB_LUN_Group, will normally replicate over LAG group a. If LAG group a links go down, the array automatically switches to LAG group b to continue replication.

Referring again to FIG. 4, the method further comprises activating a particular link selected from among the enabled communication links using a selection process adapted to characteristics of the link affinity grouping 406.

For Link Affinity Groups of disparate types, a Next Available Link (NAL) selection method can be used. In contrast to the round robin selection method that uses a next link in a circular list of links, for example, links 0, 1, 2, 3, 4, 5, 6, 7, 8, 9, 0, 1, 2, 3, 4, 5, 6, 7, 8, 9, . . . , the NAL technique enables a controller to determine which links are currently available for usage. Faster links return from service sooner than slower links so that the Next Available Link is typically one of the fastest links. Accordingly, the NAL technique can tremendously improve aggregate throughput. In contrast to the regular circular list of links using round robin selection, the NAL technique may produce a link ordering of, for example, 0, 1, 0, 1, 2, 1, 3, 0, 4, 1, . . . , where links 0 and 1 are fastest.

A disadvantage of using NAL selection is that replication writes arrive at the destination out-of-order, risking data corruption. However, in the case of writes that are ordered, for example by sequence number or time stamp, no data corruption occurs since the destination automatically resorts the data into the proper order at the remote array before data is destaged to disk.

Figure 7:
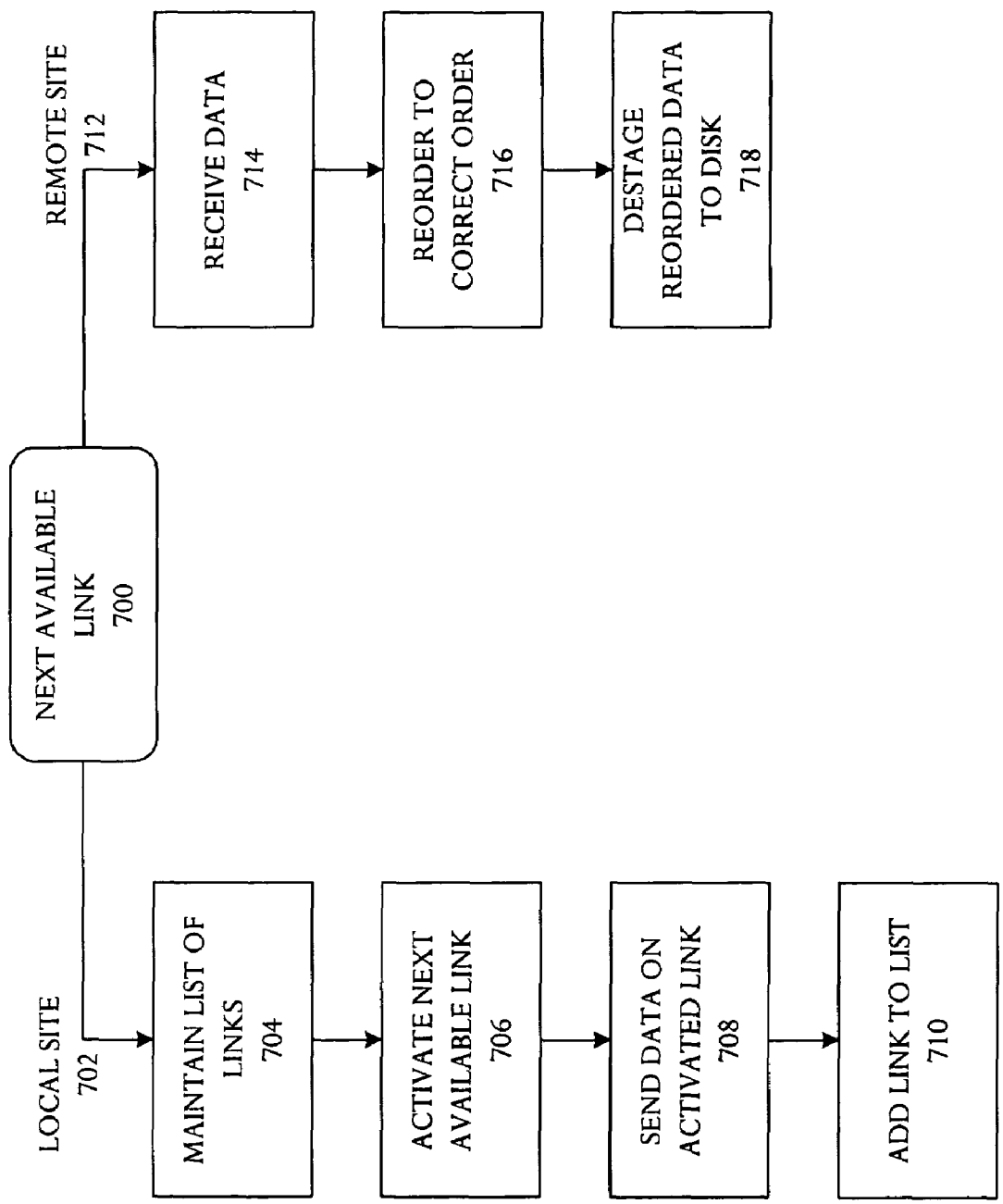
FIG. 7 is a schematic flow chart depicting an embodiment of a Next Available Link selection process.
Figure 8A:
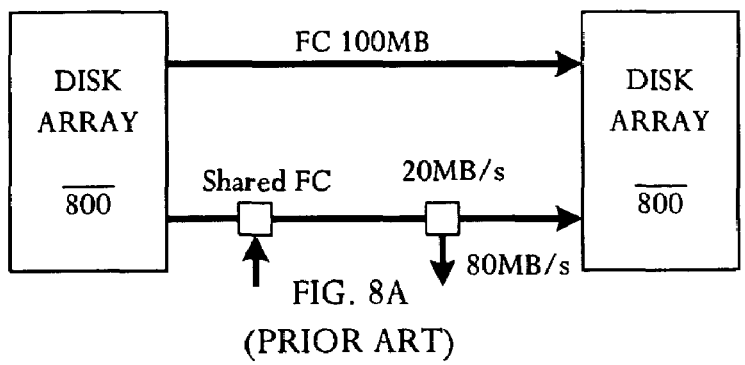
FIGS. 8A, 8B, 8C, and 8D, labeled prior art, are schematic block diagrams showing examples of detrimental throttling due to round robin usage of unmatched links.
Figure 8B:
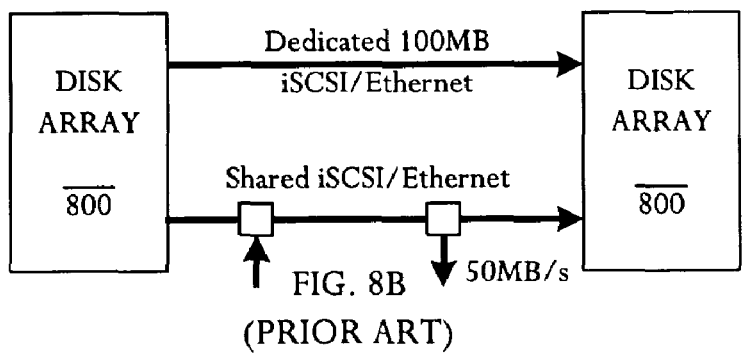
Figure 8C:
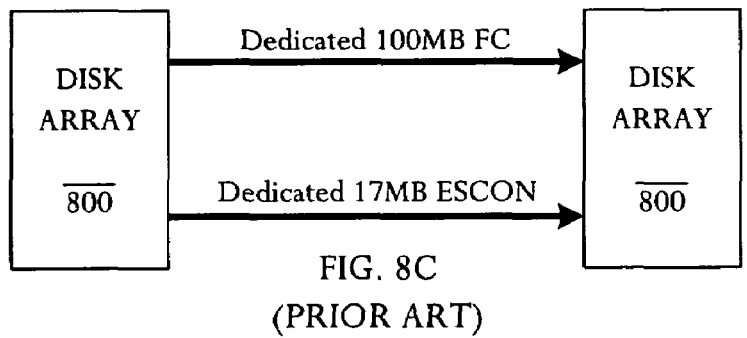
Figure 8D:
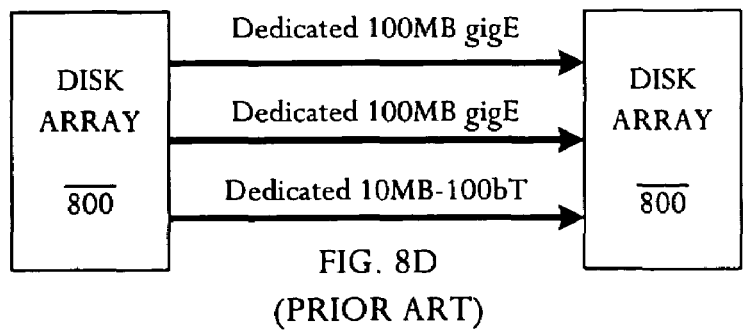

Referring to FIG. 7, a schematic flow chart depicts an embodiment of a method of a Next Available Link selection process 700. At a local site 702, the method comprises maintaining a list of links available to carry the data 704. For example, a controller maintains a circular list that can be initially set in any order. In a simple example the links can be set in numerical order, 0, 1, 2, 3, 4, 5, 6, 7, 8, 9. To send data, the next available link on the list is activated 706 and data is sent on the activated link 708. When a link is selected and used to transmit data, the link is removed from the queue and all following link numbers move to the head of the queue by one position. The link, when transmission is complete, becomes available and the corresponding number is added to the queue 710. After all links are used a first time, faster links will become available sooner and are added to the queue more rapidly. Accordingly, faster links are used more often.

At a remote site 712, a controller receives the transmitted information 714 and reorders the received information into the proper order 716. After reordering, the data is destaged 718 to disk.

In some conditions or situations, a round robin link selection process can be used. In round robin operation, each write exits the local controller on the next line in a circularly-linked list of lines, allowing the receiving side to preserve ordering by receiving and destaging writes from the available lines in the same circular sequence as was used to send the writes. Correct ordering is maintained even if a faster link, faster clock speed, or buffering delay causes a second write to arrive before the first. The next write does not leave until the previous write has at least left the sending side, although not necessarily acknowledged or completed, non-deterministically assisting to attain proper remote ordering without negating all benefits of having multiple lines. Writes for disparate LUNs can be aggregated into a larger and more efficient write operation, ensuring that links are not under-utilized due to excessive overhead while not confusing the ordering of two write destined for the same LUN.

Referring again to FIG. 4, the method of interconnecting disk arrays via a plurality of communication links 400 can be used to supply alert signals to an administrator or user 408. The system analyzes performance 410 of the enabled communication links both individually and in aggregate. If a Link Affinity Group is intended for use in a round robin selection process, throughput performance can be greatly diminished unless all links in the Link Affinity Group remain at maximum rated throughput. Throughput of a particular link can be highly variable due to multiple conditions including packet loss variations, changes to dynamic path and link distance for example for a switched circuit or switched packet, and link outages. An overloaded router or switch that non-deterministically discards packets can also cause throughput variations, along with other conditions.

As part of the analysis, the system can determine whether the aggregate performance has declined to below a predetermined limit 412. In some embodiments, the illustrative link selection system and operating method 400 enables a user to define a maximum throughput percentage variation (TPV) and a time frame (T) in which the TPV exceeds the threshold to indicate a notable decrease in performance. In the event of such performance degradation, the system can generate an alert signal 414. Various types of alert notifications can be used, such as a predetermined form of email, display of a notification web page, management graphical user interface icon color changes, and the like.

In some embodiments and conditions, the system can determine appropriate individual links for inclusion into a link affinity grouping 416. Criteria for selecting from available links include potential individual throughput, and potential aggregate throughput for a particular link group. Throughput analysis can take into account conditions such as variation in packet loss, link pathway, link reliability, and switching characteristics along the pathway. Line of sight transmission variations may affect throughput in wireless links.

Other criteria include link path security ratings, logical unit (LUN) group criticality ratings, potential throughput according to the link selection process, link cost, link availability, primary and secondary replication classification, inclusion or exclusion of multiple link affinity groups, inclusion of partial or full link affinity groups, and link direction.

Based on the determination of links for inclusion, the system can generate a recommendation for reconfiguring the link assignments 418.

In a particular example of the link mix depicted with reference to FIG. 6, a user interface can be implemented as follows:

```
LAG_Number = Link_Recommend(Criteria, Usage)
    where "Criteria" is selected from among:
        Max_aggregated_throughput
        Max_link_security
        Max_link_survivability
        and others,
    and "Usage" is selected from among:
        Round Robin (RR)
        Next Available link (NAL)
```

In the example of the link mix shown in FIG. 6, Link_Recommend(Max-Aggregated-Throughput, Round-Robin) would return a recommendation for LAG group b. In contrast, Link_Recommend(Max-Aggregated-Throughput, NAL) would return a recommendation for LAG group f.

Referring again to FIG. 4, the system can also identify an individual link such that disabling of the identified link from the aggregate in the link affinity grouping will improve aggregate throughput 420. In some conditions the deletion or disabling of a particular link can improve aggregate throughput of the Link Affinity Group. If appropriate, the system can recommend disabling of the identified link 422. An example of an interface is as follows:

throughput=Link_Analyze(link).

A call such as Link_Analyze(2) for an Enterprise System Connection (ESCON) link likely returns a throughput such as '12' (MB/s) based on monitoring of actual real-time performance.

Another example of an interface is:
LAG_Analyze(LAG designation, Usage)
    where "Usage" is selected from round robin (RR) and Next Available Link (NAL).

In one example, LAG group c includes links 6 and 7 that are defined within the array as comprising two 100 bT Local Area Network (LAN) links. The links may be either dedicated or shared on a dynamic basis and are ideally capable of generating a throughput of about 12 MB/s each. Accordingly, a request such as LAG_Analyzer(c,RR) can return a display such as:

Analysis for LAG=C, Usage=RR

| Line | Throughput |
|------|------------|
| 6    | 11.0 MB/s  |
| 7    | 2.5 MB/s   |

Recommendation: Deleting link 7 can raise LAG throughput from 5.0 MB/s to 11.0 MB/s The system can also determine whether altering assignment of links of two link affinity groups will improve throughput of both groups 424, and generate a recommendation accordingly 426. At times altering the mix of links within Link Affinity Groups can improve aggregate throughput for both groups. For example, if the system determines that LAG group c is currently used with a round robin (RR) selection assignment and LAG group d is used with a Next Available Link (NAL) assignment, then an appropriate call may be, as follows:

Recommend_Link_Mix(LAG 1, Usage 1, LAG 2, Usage 2)

where "LAG" refers to Link Affinity Groups selected for comparison, and "Usage" is selected from round robin (RR) and Next Available Link (NAL).

A request such as Recommend_Link_Mix(c, RR, d, NAL) may generate a recommendation as follows:

Analysis for LAG=C and Usage=RR, and LAG=D and Usage=NAL

| Line | Throughput |
|------|------------|
| 6    | 11.0 MB/s  |
| 7    | 2.5 MB/s   |
| 8    | 5.0 MB/s   |

Recommendation: Moving link 7 to LAG d could raise LAG c throughput from 5.0 MB/s to 11.0 MB/s, and simultaneously raise LAG d throughput from 5.0 MB/s to 7.5 MB/s In some embodiments, the system can be configured to automatically carry out the recommendations 428, for example by disabling a selected link or reassigning links within Link Affinity Groups.

The various functions, processes, methods, and operations performed or executed by the system can be implemented as programs that are executable on various types of processors, controllers, central processing units, microprocessors, digital signal processors, state machines, programmable logic arrays, and the like. The programs can be stored on any computer-readable medium for use by or in connection with any computer-related system or method. A computer-readable medium is an electronic, magnetic, optical, or other physical device or means that can contain or store a computer program for use by or in connection with a computer-related system, method, process, or procedure. Programs can be embodied in a computer-readable medium for use by or in connection with an instruction execution system, device, component, element, or apparatus, such as a system based on a computer or processor, or other system that can fetch instructions from an instruction memory or storage of any appropriate type. A computer-readable medium can be any structure, device, component, product, or other means that can store, communicate, propagate, or transport the program for use by or in connection with the instruction execution system, apparatus, or device.

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. For example, although the illustrative embodiments depict processes and methods that are combined to perform various functions. The various functionalities may be omitted or utilized in different combinations in selected embodiments.

The illustrative system depicts a particular set of considerations for defining link affinity groups. Other types of considerations may be taken into account for defining LAGs. The illustrative system and techniques are not limited to particular link technologies and are expected to operate for all link and communication technologies and at all throughput rates. The illustrative systems, methods, and articles of manufacture can be implemented in and for usage on various devices or products including disk arrays, host computers, switches, directors, protocol converters, and the like.

What is claimed is:

1. A method of interconnecting a network infrastructure via a plurality of communication links comprising:

defining a link affinity grouping based on a plurality of criteria including throughput for round-robin scheduling and throughput for a next available link scheduling;

classifying the plurality of communication links according to a link affinity grouping;

enabling and disabling selective ones of the plurality of communication links according to the link affinity grouping;

activating a particular link selected from among the enabled communication links using a selection process adapted to characteristics of the link affinity grouping;

analyzing performance of the enabled communication links individually and in aggregate;

determining based on the analysis, whether altering assignment of links of two link affinity groups will improve throughput of both groups; and defining the link affinity grouping (LAG) based on a plurality of criteria further including classification as primary and secondary link groups for replication of a logical unit (LUN) group, classification into intra-LAG groups, classification into inter-LAG partial inclusion groups, classification into inter-LAG full inclusion groups, classification as outbound (failover) links, and classification as inbound (failback) links.

2. The method according to claim 1 further comprising:
determining whether the aggregate performance has declined to below a predetermined limit.

3. The method according to claim 2 further comprising:
generating an alert signal when the aggregate performance declines to below the predetermined limit.

4. The method according to claim 1 further comprising:
identifying an individual link wherein, based on the analysis, disabling of the identified link from the aggregate in the link affinity grouping will improve aggregate throughput.

5. The method according to claim 4 further comprising:
automatically disabling the identified link.

6. The method according to claim 4 further comprising:
recommending disabling of the identified link.

7. The method according to claim 1 further comprising:
recommending, based on the analysis, appropriate individual links for inclusion into a link affinity grouping based on criteria selected from among a group consisting of:
potential throughput, link path security ratings, logical unit (LUN) group criticality ratings, potential throughput according to the link selection process, link cost, link availability, primary and secondary replication classification, inclusion or exclusion of multiple link affinity groups, inclusion of partial or full link affinity groups, and link direction.

8. The method according to claim 1 further comprising:
selecting a link for activation in a data replication operation comprising:
maintaining a list of available links;
including a link on the list when the link becomes available;
activating the next available link on the list;
sending information over the activated next available link;
receiving the sent information at a remote site; and
reordering the received information into a proper order at the remote site.

9. A storage system stored on a computer readable medium comprising:
an interface capable of interconnecting a network infrastructure via a plurality of communication links, the plurality of communication links having a diversity of data-carrying capacity and performance;
a controller coupled to the interface that assigns the plurality of communication links into at least one link affinity group based on performance criteria including throughput for round-robin scheduling and throughput for a next available link scheduling, and that controls link selection based on link affinity group assignment;
the controller manages ordered asynchronous disk array replication by enabling and disabling selective ones of the plurality of communication links according to the link affinity grouping, and activating a particular link selected from among the enabled communication links using a selection process adapted to characteristics of the link affinity grouping;
the controller determines, based on the analysis, whether altering assignment of links of two link affinity groups will improve throughput of both groups; and
the controller that assigns the plurality of communication links into at least on link affinity group based on performance criteria further including classification as primary and secondary link groups for replication of a logical unit (LUN) group, classification into intra-LAG groups, classification into inter-LAG partial inclusion groups, classification into inter-LAG full inclusion groups, classification as outbound (failover) links, and classification as inbound (failback) links.

10. The storage system according to claim 9 wherein:
the controller analyzes performance of the enabled communication links individually and in aggregate.

11. The storage system according to claim 10 wherein:
the controller manages synchronous and unordered asynchronous disk array replication by communicating data over all available links in a round-robin order, determines whether the aggregate performance has declined to below a predetermined limit, and generates an alert message for performance declines below the limit.

12. The storage system according to claim 11 wherein:
the controller identifies individual links wherein, based on the analysis, disabling of the identified link from the aggregate in the link affinity grouping will improve aggregate throughput.

13. The storage system according to claim 9 wherein:
the controller selects a link for activation in a data replication operation by:
maintaining a list of available links;
including a link on the list when the link becomes available;
activating the next available link on the list;
sending information over the activated next available link;
receiving the sent information at a remote site; and
reordering the received information into a proper order at the remote site.

14. The storage system according to claim 9 wherein:
the controller determines whether the aggregate performance has declined to below a predetermined limit, and generates an alert message for performance declines below the limit.

15. The storage system according to claim 9 wherein:
the controller determines appropriate individual links for inclusion into a link affinity grouping based on criteria selected from among a group consisting of: potential throughput, link path security ratings, logical unit (LUN) group criticality ratings, potential throughput according to the link selection process, link cost, link availability, primary and secondary replication classification, inclusion or exclusion of multiple link affinity groups, inclusion of partial or full link affinity groups, and link direction.

16. The storage system according to claim 9 wherein:
the controller identifies individual links wherein, based on the analysis, disabling of the identified link from the aggregate in the link affinity grouping will improve aggregate throughput.

17. The storage system according to claim 10 wherein:
the controller manages disk array replication using a protocol converter by communicating data over all available links in a round-robin order over identical throughput links.

18. An article of manufacture comprising:
a controller usable storage medium having a computer readable program code embodied therein for interconnecting a network infrastructure via a plurality of communication links, the computer readable program code further comprising:

a code causing the controller to define a link affinity grouping based on a plurality of criteria including throughput for round-robin scheduling and throughput for a next available link scheduling;

a code causing the controller to classify the plurality of communication links according to a link affinity grouping;

a code causing the controller to enable and disable selective ones of the plurality of communication links according to the link affinity grouping;

a code causing the controller to activate a particular link selected from among the enabled communication links using a selection process adapted to characteristics of the link affinity grouping;

a code causing the controller to analyze performance of the enabled communication links individually and in aggregate;

a code causing the controller to determine, based on the analysis, whether altering assignment of links of two link affinity groups will improve throughput of both groups; and a code causing the controller to define the link affinity grouping (LAG) based on a plurality of criteria further including classification as primary and secondary link groups for replication of a logical unit (LUN) group, classification into intra-LAG groups, classification into inter-LAG partial inclusion groups, classification into inter-LAG full inclusion groups, classification as outbound (failover) links, and classification as inbound (failback) links.

19. The article of manufacture according to claim 18 further comprising:

a code causing the controller to determine, based on the analysis, appropriate individual links for inclusion into a link affinity grouping based on criteria selected from among a group consisting of:

potential throughput, link path security ratings, logical unit (LUN) group criticality ratings, potential throughput according to the link selection process, link cost, link availability, primary and secondary replication classification, inclusion or exclusion of multiple link affinity groups, inclusion of partial or full link affinity groups, and link direction.

20. The article of manufacture according to claim 18 further comprising:

a code causing the controller to maintain a list of available links;

a code causing the controller to include a link on the list when the link becomes available;

a code causing the controller to activate the next available link on the list;

a code causing the controller to send information over the activated next available link;

a code causing the controller to receive the sent information at a remote site; and a code causing the controller to reorder the received information into a proper order at the remote site.

21. The method according to claim 1 further comprising:
defining the link affinity grouping based on a plurality of criteria further including characteristics of link path security, link cost, and conditions of link availability.

22. A method of interconnecting a network infrastructure via a plurality of communication links comprising:

defining a link affinity grouping based on a plurality of criteria including throughput for round-robin scheduling and throughput for a next available link scheduling;

classifying the plurality of communication links according to a link affinity grouping;

enabling and disabling selective ones of the plurality of communication links according to the link affinity grouping;

activating particular link selected from among the enabled communication links using a selection process adapted to characteristics of the link affinity grouping;

defining the link affinity grouping based on a plurality of criteria further including characteristics of link path security, link cost, and conditions of link availability; and defining the link affinity grouping (LAG) based on a plurality of criteria further including classification as primary and secondary link groups for replication of a logical unit (LUN) group, classification into intra-LAG groups, classification into inter-LAG partial inclusion groups, classification into inter-LAG full inclusion groups, classification as outbound (failover) links, and classification as inbound (failback) links.

23. The storage system according to claim 9 further comprising:

the controller that assigns the plurality of communication links into at least one link affinity group based on performance criteria further including characteristics of link path security, link cost, and conditions of link availability.

24. A storage system stored on a computer readable medium comprising:

an interface capable of interconnecting a network infrastructure via a plurality of communication links, the plurality of communication links having a diversity of data-carrying capacity and performance;

a controller coupled to the interface that assigns the plurality of communication links into at least one link affinity group based on performance criteria including throughput for round-robin scheduling and throughput for a next available link scheduling, and that controls link selection based on link affinity group assignment; and the controller that assigns the plurality of communication links into at least one link affinity group based on performance criteria further including classification as primary and secondary link groups for replication of a logical unit (LUN) group, classification into intra-LAG groups, classification into inter-LAG partial inclusion groups, classification into inter-LAG full inclusion groups, classification as outbound (failover) links, and classification as inbound (failback) links.

\* \* \* \* \*

UNITED STATES PATENT AND TRADEMARK OFFICE
CERTIFICATE OF CORRECTION

PATENT NO. : 7,478,154 B2  
APPLICATION NO. : 10/608585  
DATED : January 13, 2009  
INVENTOR(S) : Robert A. Cochran et al.

Page 1 of 1

It is certified that error appears in the above-identified patent and that said Letters Patent is hereby corrected as shown below:

In column 13, line 66, in Claim 9, delete "at least on" and insert -- at least one --, therefor.

In column 16, line 15, in Claim 22, after "activating" insert -- a --.

In column 16, line 48, in Claim 24, delete "assignment" and insert -- assignments --, therefor.

Signed and Sealed this

Twelfth Day of May, 2009

JOHN DOLL  
*Acting Director of the United States Patent and Trademark Office*